Feb. 18, 1941.     W. L. GROENE     2,232,227
CRANKSHAFT CHUCK
Filed Dec. 22, 1939     2 Sheets-Sheet 1
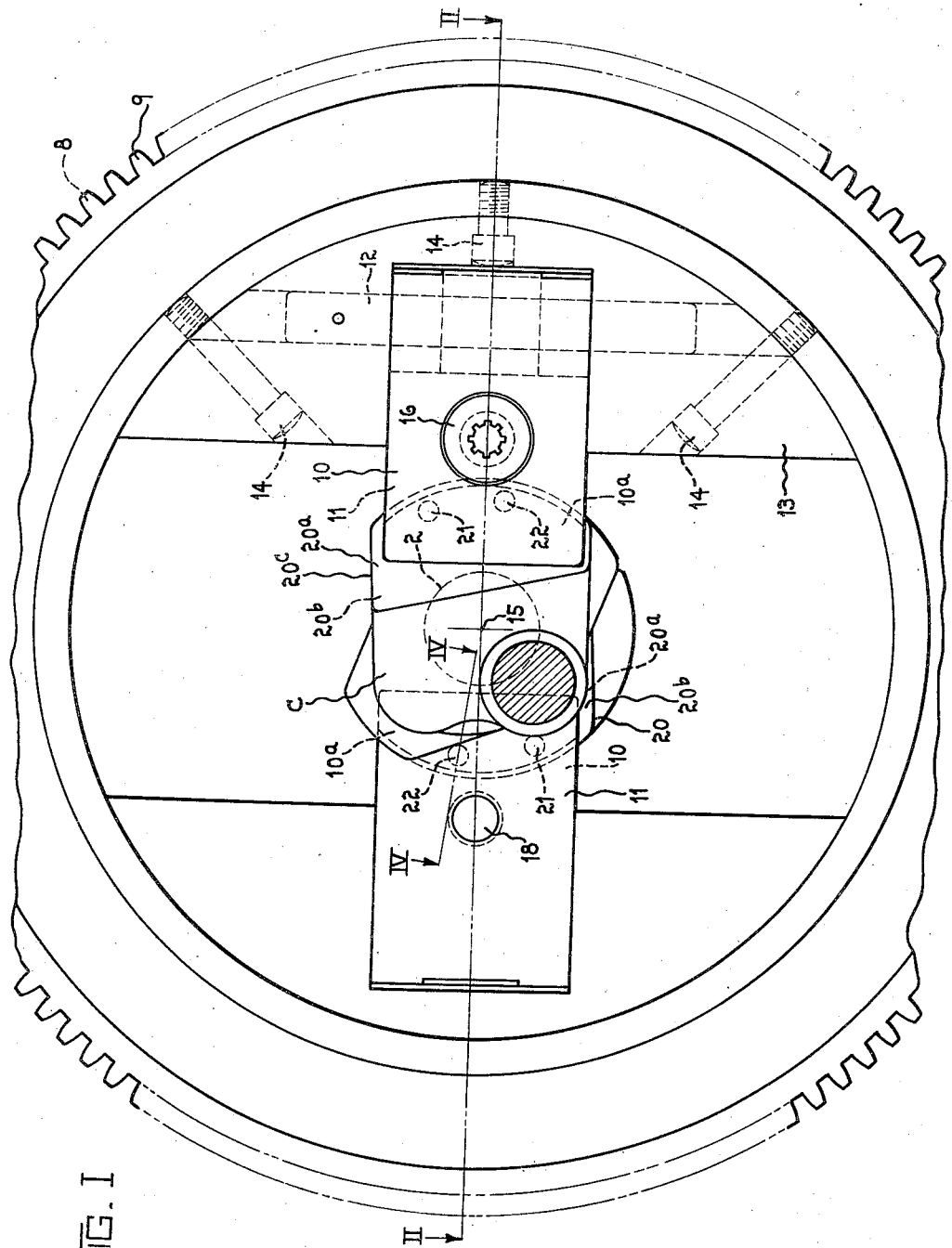
FIG. I
INVENTOR.
Willard L. Groene

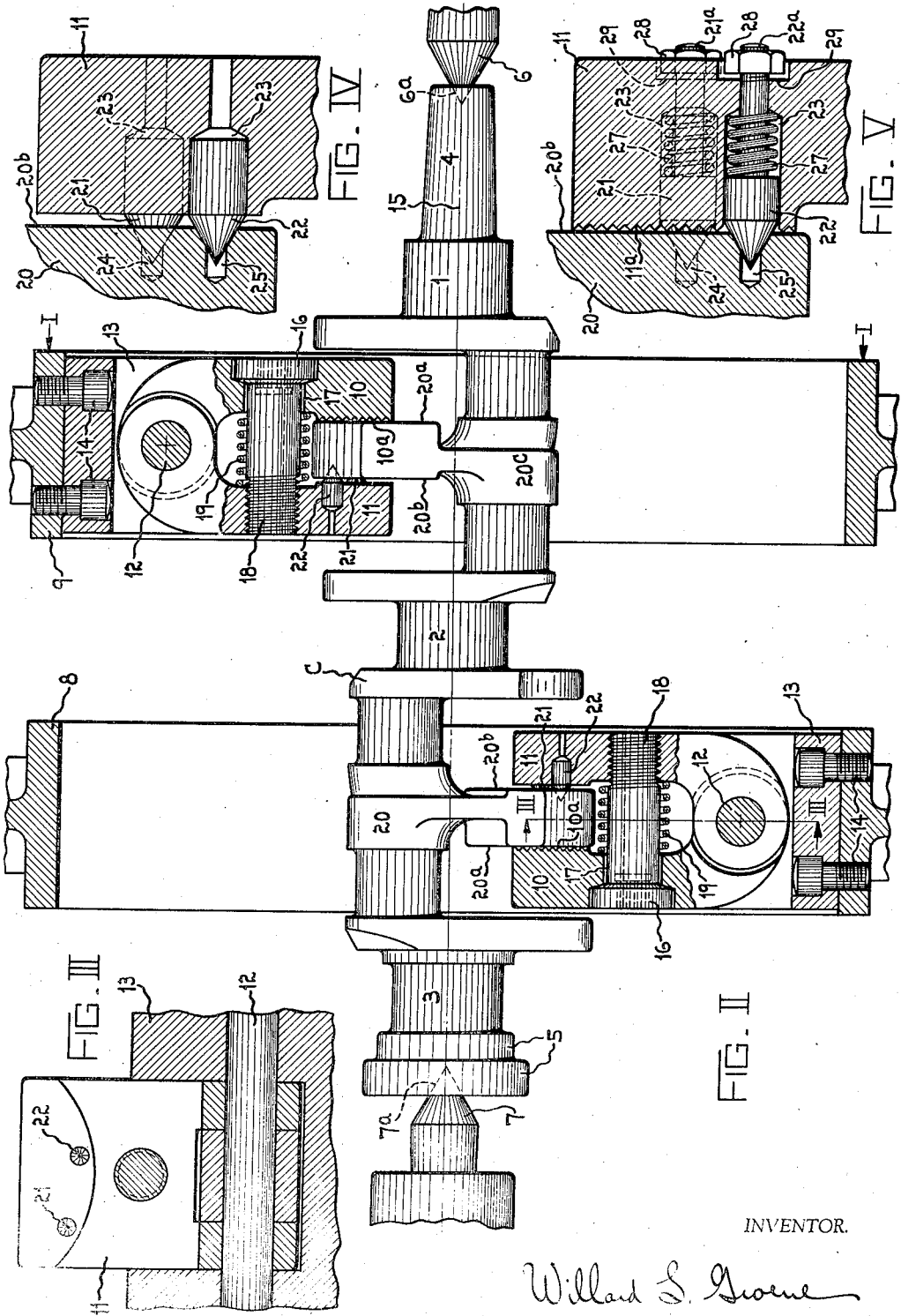

Patented Feb. 18, 1941

2,232,227

UNITED STATES PATENT OFFICE 2,232,227

CRANKSHAFT CHUCK

Willard L. Groene, Cincinnati, Ohio, assignor to The R. K. Le Blond Machine Tool Company, Cincinnati, Ohio, a corporation of Delaware Application December 22, 1939, Serial No. 310,590

13 Claims. (Cl. 82—40)

This invention pertains to work rotating and chucking mechanism for use in machine tools, particularly in lathes. More specifically this invention pertains to chucking mechanism for gripping crankshafts for machining their various bearing portions in lathes or the like.

For illustrative purposes this invention is shown applied to the chucking and driving of crankshafts which are to have all of their line bearing portions simultaneously machined in a single operation in lathes, for example, of a type shown in Patent 2,069,107 dated January 26, 1937. The primary object of this invention is to provide a work driving and chucking mechanism which is adaptable to engage a crankshaft in such a way as to positively and securely hold it in proper axial alignment on the work axis of the lathe at all times both during the initial chucking of the crankshaft and during the cutting action of the tools on the work.

Heretofore, great difficulty has been experienced in attempting to chuck crankshafts in lathes, particularly of the center drive type in which the crankshaft is placed on the usual lathe centers to support each end of the shaft for initially positioning it on the work spindle axis. It was then the problem to provide a proper chucking device for engaging either the rough unmachined crankshaft webs or to provide small milled locating notches on periphery of the webs, such an arrangement for example being shown in Patent 2,030,020 dated February 4, 1936.

Both of these former methods have inherent defects and have failed to provide satisfactory performance in that it has been impossible to accurately chuck the crankshaft without distorting it from true prelocated position on the work axis of the lathe. In the first case, the difficulty has come from the fact that in gripping the rough crankshaft web, the rough irregular scale and other surface irregularities have made it substantially impossible to apply powerful gripping jaws sufficient to hold the shaft from being distorted in the chuck during the cutting operation without an initial resetting or moving of the crankshaft in the chuck taking place during the cutting operation of the tools on the work. It is to be remembered that in an operation of this kind it is desirable to keep the runout of the shaft less than .001″ in order to effect real savings in the subsequent grinding operations to be undertaken on the bearing portion of the shaft, such type chucking mechanism, adapted to gripping the rough webs of the shaft, has been found wholly inadequate.

In connection with the use of small milled locating areas, the difficulty experienced has come from the fact that it has been impossible to accurately mill or otherwise machine the small locating notches on the periphery of the webs with sufficient accuracy to be within the limit of the runout required on the shaft. Both the use of the gripping of the rough crankshaft webs and the use of machined milled locating areas on the periphery of the web have failed because of the inherent weakness of applying pressure to the crankshaft perpendicular to the axis of rotation of the shaft which invariably causes axial displacement of bending of the shaft from its true axial position.

The rough web gripping type of chuck pressure is applied to the web from a radial direction and, aside from the slipping which occurs due to the rough surface irregularity crushing down under the gripping jaws, this radial clamping of the web causes axial distortion of the crankshaft. Likewise when milled locating areas are used on the periphery of the web milling or other machining operations which cut these notches on the webs causes axial distortion and bending in the shaft preventing the accurate positioning of these locating notches on the web so that when it is chucked in the crankshaft chuck, the shafts will not run dead true on its axis of rotation.

One object of this invention is to provide a chucking arrangement for gripping a rough irregular work piece which grips the work piece with members which engage the work in a direction substantially parallel to its axis of rotation in the lathe and which gripping mechanism incorporates locating means for accurately positioning the crankshaft in all radial directions in a plane perpendicular to said axis of rotation.

Another object of this invention is to provide in a center drive crankshaft turning lathe, chucking mechanism which grips the webs of the crankshaft in a direction substantially parallel to its axis of rotating in the lathe and which clamping mechanism has locating means in conjunction therewith for accurately positioning the crankshaft in a plane perpendicular to the axis of rotation of said lathe, said clamping means having free floating movement in a direction parallel to said axis of rotation.

A further object of this invention is to provide in a center drive lathe for gripping a crankshaft for turning its line bearing portions, a chucking mechanism having serrated jaws adapted to grip the sides of the webs of the crankshaft and to provide in conjunction with these jaws locating plungers adapted to engage premachined locating holes formed in the sides of the webs of the crankshaft so that clamping action will be effected in a line parallel with the axis of rotation of crankshaft of the lathe and will also accurately locate the web positively and accurately in a plane perpendicular to said axis of rotation.

Another object of this invention is to provide a chucking device for gripping a prelocated work piece in the lathe which effects clamping of the work in a direction substantially parallel to the axis of rotation of the work and which has a locating function operating substantially perpendicular to said direction of clamping action so that the clamping action is entirely independent of the locating function of the work engaging mechanism.

Further features and advantages of this invention will appear in the detailed description of the drawings in which—

Fig. I is a view axially of a double center drive crankshaft lathe incorporating the novel chucking mechanism of this invention, shown on the line I—I of Fig. II.

Fig. II is a transverse section through a pair of center drive ring gear chucking devices shown on the line II—II of Fig. I.

Fig. III is a detailed view of one of the work engaging jaws shown on the line III—III of Fig. II showing the serrated work engaging portion and the locating plungers associated therewith.

Fig. IV is an enlarged detailed view on the line IV—IV of Fig. I showing an arrangement in which the locating plungers perform the combined functions of locating and gripping the work.

Fig. V is a similar view to that of Fig. IV on the line IV—IV of Fig. I but showing the arrangement of the locating plungers utilized in conjunction with the serrated gripping jaw face.

For illustrative purposes, this invention is shown applied to the difficult problem of simultaneously turning all of the line bearings 1, 2, and 3, the stub end 4 and flange end 5 of a work crankshaft C as illustrated in Fig. II. The crankshaft is supported on centers 6 and 7 in the usual way in center drive lathes of a character in the Patent 2,069,107 above cited. Intermediate these centers 6 and 7 are rotary center drive ring gears 8 and 9 suitably journaled and driven in the frame of such a lathe. In each of these ring gears is provided a chucking device comprising a pair of work engaging jaws 10 and 11 which are hinged together on the hinge pin 12 fixed in the segmental members 13 appropriately fastened to the ring gears 8 or 9 by suitable screws 14. These jaws 10 and 11 are adapted to be drawn together in clamping action substantially parallel with the axis of rotation 15 of the lathe and work crankshaft C by means of suitable clamping screws 16 which pass through appropriate clearance holes 17 in the jaws 10 and are threaded at 18 in the jaws 11. Suitable compression springs 19 surrounding the clamping screws 16 serve to spread the jaws 10 and 11 apart when the screw 16 is backed off in releasing jaws from engagement with the crankshaft C.

The work engaging portion of these jaws 10 and 11 perform a unique function in the clamping and accurate positive location of the crankshaft on its true axis of rotation 15 without in any way distorting it from this true axis, either during the initial clamping or by allowing any slippage of the work during the cutting action of the tools on the work. The jaws 10 have serrated work engaging faces 10a which are adapted to engage and bite into the rough surface 20a of the webs 20 and 20c.

The jaw 11 may be constructed in two ways: one way is that shown in Fig. IV in which the jaw 11 has the series of fixed locating and gripping plungers 21 and 22 fixed in appropriate bores 23 in the jaw 11 and accurately projecting a predetermined distance from the jaw 11. These fixed locating plungers are arranged to engage premachined locating holes 24 and 25 respectively (which may be similar to the center holes 6a and 7a formed in the ends of the crankshaft though any form of locating holes may be used) in the sides 20b of the webs 20 and 20c in a predetermined relationship to the axis of rotation 15 of the crankshaft, the locating plungers 21 and 22 being similarly accurately located in the chuck body against any radial movement in a plane perpendicular to this axis of rotation 15 and in a definite relationship thereto so that when the jaw 11 is engaged against the web 20 with its locating plungers 21 and 22 properly engaged in the corresponding locating holes 24 and 25 in the webs 20 and 20c the crankshaft will be positively and accurately positioned on the axis 15 of the lathe. Further tightening of the screw 16 will cause the jaws 10 to bring their serrated portions 10a against the opposite sides 20a of the webs 20 or 20c to thus rigidly bind the jaws 11 and its locating plungers 21 and 22 into rigid engagement with the corresponding locating holes in the web 20 so as to position the shaft accurately in all directions in a plane substantially perpendicular to the axis 15 of the chuck and to provide a gripping arrangement which, while free to float longitudinally of the axis 15 so that the shaft may be axially positioned longitudinally of said axis by the centers 6 and 7, the clamping action of said clamping means will have no effect whatever on the axial displacement of the crankshaft from the true axis 15 of the lathe.

As an alternative construction which may be utilized to give additional clamping action both of the jaws 10 and 11 may have serrated surfaces 10a and 11a respectively as illustrated in Fig. V. In this particular construction the plungers may be made axially slidable in the bores 23, the plungers being urged outwardly by appropriate compression springs 27 which move these plungers outwardly somewhat beyond the position they finally occupy at the time of final clamping up of the work between the jaws 10 and 11. The outward movement of these plungers 21 and 22 as effected by the spring 27 is limited by engagement of their nuts 28 threaded on the rearwardly projecting stems 21a and 22a of the plungers which engage in the bottoms of the counterbores 29 in the jaw 11. In this construction when the jaws 10 and 11 are finally clamped up on the web both the serrated surfaces 10a and 11a firmly engage the crankshaft web on the sides 20a and 20b, the plungers 21 and 22 being pushed backwardly to assume the position shown in Fig. V. Springs 27 however, are provided with sufficient force so that any tendency of the crankshaft to try to move in a plane perpendicular to the axis 15 of the lathe will be prevented since the angle on the conical point of the plungers 21 and 22 may be selected in such a way that motion which would be parallel with the face of the serrated jaw 11a would be insufficient to push these plungers backwardly in their bores 23 against the springs 27. With this construction the free movement of the plungers 21 and 22 outwardly to engage the locating holes 24 and 25 in the web can easily take place so that the accurate location of the shaft is accomplished.

Thus with this construction we provide a combined serrated jaw gripping arrangement with a rigid locating, supporting, and driving means which accurately supports and locates the crankshaft rigidly against any bending or distortion relative to the axis 15 but which at the same time provides a floating clamping arrangement which permits free axial movement of the crankshaft C parallel with the axis 15 for longitudinal positioning of the shaft by the lathe centers 6 and 7.

Having thus fully set forth and described my invention what I claim as new and desire to secure by United States Letters Patent is:

1. In a lathe, a rotary work spindle, chucking mechanism mounted on said work spindle comprising work engaging members movable to and from a work piece on said work spindle in a direction substantially parallel to the axis of rotation of said work spindle, locating means in connection with said work engaging members cooperating with premachined locating areas in the side of a work piece to be gripped by said chucking mechanism, means for binding said work engaging members to said work piece, and means preventing radial movement of said members relative to said axis.

2. In a lathe, means for supporting the ends of a work piece on the axis of rotation of said lathe, a rotatable work spindle located intermediate said supporting means, a chucking device in said work spindle comprising work engaging members movable to and from a work piece to be gripped in said device in a direction substantially parallel to the axis of rotation of said work spindle, premachined locating areas provided on said work engaging members adapted to engage corresponding premachined locating areas on said work piece, and means associated with said work engaging members to effect locking of said work engaging members on said work piece, and means on said work spindles to restrict movement of said members so as to accurately and rigidly position said work piece in a plane perpendicular to the axis of rotation of said work spindle.

3. In a center drive crankshaft lathe, a pair of centers adapted to engage the ends of a crankshaft to be machined in said lathe, a center drive gear rotatably mounted intermediate said centers, a pair of work engaging jaws adapted to engage the sides of a web of said crankshaft, said jaws having movement substantially parallel to the axis of rotation of said crankshaft in said lathe, locating means in said jaws adapted to engage premachined mating locating areas in the sides of said web, means associated with said jaws to bind said jaws to the sides of said web, and means preventing radial movement of said jaws relative to said axis.

4. In a lathe, a rotary work spindle, chucking mechanism on said work spindle, locating means in connection with said chucking mechanism for positioning a work piece in said chuck in a plane substantially perpendicular to the axis of rotation of said work spindle, clamping means in connection with said chucking mechanism operating to grip said work piece in said chucking device in a direction substantially perpendicular to said plane and means for holding said clamping means against movement in said first mentioned claim.

5. In a lathe, a rotatable work spindle, chucking mechanism on said work spindle comprising a pair of opposed work engaging members movable substantially parallel to the axis of rotation of said work spindle, means for moving said members relative to each other to grip a work piece between them, and locating means in connection with said members to accurately and positively position the work piece in a plane perpendicular to the axis of rotation of said work spindle.

6. In a lathe, a rotatable work spindle, a pair of work engaging jaws pivotally mounted on said work spindle so that their outer ends swing in a direction substantially parallel to the axis of rotation of said work spindle, clamping means in connection with said jaws for moving them relative to each other to grip a work piece between them, locating means in said work engaging members adapted to engage corresponding locating means in a work piece to be gripped in said chucking device to accurately position said work piece in a plane substantially perpendicular to the axis of rotation of said work spindle.

7. In a lathe, a rotatable work spindle, a pair of clamping jaws pivotally mounted on said work spindle, means for moving them relative to each other to effect gripping of the work piece between said gripping jaws, resilient means for automatically urging said gripping jaws away from each other when said moving means is released, serrated end portions on said jaws adapted to engage a rough irregular work piece in a direction substantially parallel to the axis of rotation of said work spindle, and locating means in connection with said jaws to accurately and positively position a work piece in said chucking device in a plane substantially perpendicular to said axis of rotation of said work spindle.

8. In a lathe, a rotatable work spindle, chucking mechanism mounted on said work spindle comprising jaws hinged together about a hinge pin fixed on said work spindle so that said outer ends of said jaws may swing in a direction substantially parallel to the axis of rotation of said work spindle to engage a work piece in said chucking device, means preventing all radial or circumferential movement of said jaws in a plane perpendicular to said axis of rotation, clamping means associated with said jaws for moving them relative to each other to grip a work piece between them, resilient means for moving said jaws away from each other to release the work piece from said jaws when said clamping means is rendered inoperative, serrated end portions on some of said jaws to engage a rough work piece in said chucking device, and locating plungers in some of said jaws adapted to engage mating locating areas in said work piece for accurately positioning said work piece on the axis of rotation of said work spindle.

9. In a lathe, a rotatable work spindle, a pair of gripping jaws pivotally mounted on said work spindle, serrated end portions on said jaws adapted to move substantially parallel to the axis of rotation of said work spindle to grip the work between said serrated portions, means for effecting clamping of said serrated portions on said work piece in said chuck, and locating plunger means resiliently mounted in said serrated end portions adapted to engage corresponding locating means in the work piece to be gripped so as to accurately and positively locate said work piece on the axis of rotation of said work spindle while said serrated jaw portions firmly grip said work piece while so located by said locating means.

10. In a center drive crankshaft lathe, a pair of centers for rotatably supporting the end portions of a crankshaft to be machined in said lathe, a center drive ring gear in said lathe having chucking mechanism comprising means for locating said crankshaft in a plane perpendicular to said axis of rotation of said lathe consisting of locating plungers in the work engaging means of said chucking mechanism in definite relation to said axis adapted to engage mating machined locating holes in the sides of the webs of said crankshaft, clamping means associated with said work engaging means for effecting gripping of the sides of said webs by movement in a direction substantially parallel to the axis of rotation of said work spindle to bind said work engaging members on the webs of said crankshaft.

11. In a double center drive crankshaft lathe, a pair of centers for rotatably supporting the end portions of the crankshaft to be machined in said lathe, a pair of center drive ring gears in said lathe having chucking mechanism with locating plungers adapted to engage the locating holes in the sides of axially spaced webs of said crankshaft for accurately locating said shaft on the axis of rotation of said lathe, and having clamping means operable in a direction substantially parallel to said axis of rotation for binding said chucking mechanism on the sides of said webs of said crankshaft, and operating means for positively effecting clamping of said chucking mechanism on said crankshaft webs.

12. In a double center drive crankshaft lathe, a pair of centers for rotatively supporting the ends of a crankshaft to be machined in said lathe, a pair of rotary ring gears located between said centers, chucking mechanism in each of said ring gears comprising pairs of pivotally mounted work engaging jaws having serrated portions adapted to engage the sides of axially spaced webs of said crankshaft, locating plunger mechanism in conjunction with said jaws adapted to engage mating locating holes in the sides of the webs of said crankshaft for positively and accurately locating said crankshaft on the axis of rotation of said lathe, and means for effecting said clamping action in said jaws.

13. In a double center drive crankshaft lathe, a pair of centers for rotatively supporting the ends of a crankshaft to be machined in said lathe, a pair of rotary ring gears located between said centers, chucking mechanism in each of said ring gears comprising pairs of pivotally mounted work engaging jaws having serrated portions adapted to engage the sides of axially spaced webs of said crankshaft, locating plunger mechanism in conjunction with said jaws adapted to engage mating locating holes in the sides of the webs of said crankshaft for positively and accurately locating said crankshaft on the axis of rotation of said lathe, means for effecting said clamping action in said jaws, said chucking mechanism in one of said ring gears being located diametrically opposite that in the other of said ring gears relative to said axis of rotation of said lathe.

WILLARD L. GROENE.